United States Patent [19]

Marshall et al.

[11] 4,253,644
[45] Mar. 3, 1981

[54] FLUID CLOSURE FOR AND METHOD OF PREVENTING FLOW THROUGH AN OPENING IN A FLUID AND PARTICULATE CONFINING AND CONVEYING STRUCTURE

[75] Inventors: John M. Marshall, Crown Point; Timothy A. Veslocki, Highland, both of Ind.; James J. Sulicz, Calumet City, Ill.

[73] Assignee: Inland Steel Company, Chicago, Ill.

[21] Appl. No.: 966,085

[22] Filed: Dec. 4, 1978

[51] Int. Cl.³ ............................................. C21C 5/42
[52] U.S. Cl. ................................... 266/44; 98/115 R; 266/144; 266/158; 75/60
[58] Field of Search .......................... 266/144–159, 266/87–89, 44; 75/59, 60; 98/115 R, 36; 202/247, 248; 126/307 R

[56] References Cited

U.S. PATENT DOCUMENTS

| 2,273,903 | 2/1942 | Smailey et al. ........................ 266/87 |
| 3,630,719 | 12/1971 | Craig ........................................ 75/43 |
| 3,719,136 | 3/1973 | Criddle .................................... 98/36 |
| 3,843,461 | 10/1974 | Allen ..................................... 202/227 |
| 3,863,906 | 2/1975 | Vicard .................................... 266/158 |
| 3,897,721 | 8/1975 | Fuhst ..................................... 98/115 R |
| 3,907,264 | 9/1975 | Desaar ................................. 266/34 LM |
| 3,930,641 | 1/1976 | Overmyer et al. .................... 266/16 |
| 4,032,110 | 6/1977 | Ziegler .................................. 266/158 |
| 4,052,005 | 10/1977 | Rymarchyk, Jr. ................. 239/132.3 |

FOREIGN PATENT DOCUMENTS

| 1234966 | 2/1967 | Fed. Rep. of Germany ............. 98/36 |
| 1263264 | 3/1968 | Fed. Rep. of Germany ............. 98/36 |
| 1289856 | 2/1969 | Fed. Rep. of Germany . |
| 995858 | 6/1965 | United Kingdom . |

*Primary Examiner*—L. Dewayne Rutledge
*Assistant Examiner*—Michael L. Lewis
*Attorney, Agent, or Firm*—Merriam, Marshall & Bicknell

[57] ABSTRACT

This invention relates to a fluid closure for preventing gaseous and particulate material from flowing through an opening in a fluid confining structure, and more particularly relates to a fluid curtain for sealing a lance port in a gas collecting hood for an oxygen steelmaking furnace.

22 Claims, 5 Drawing Figures

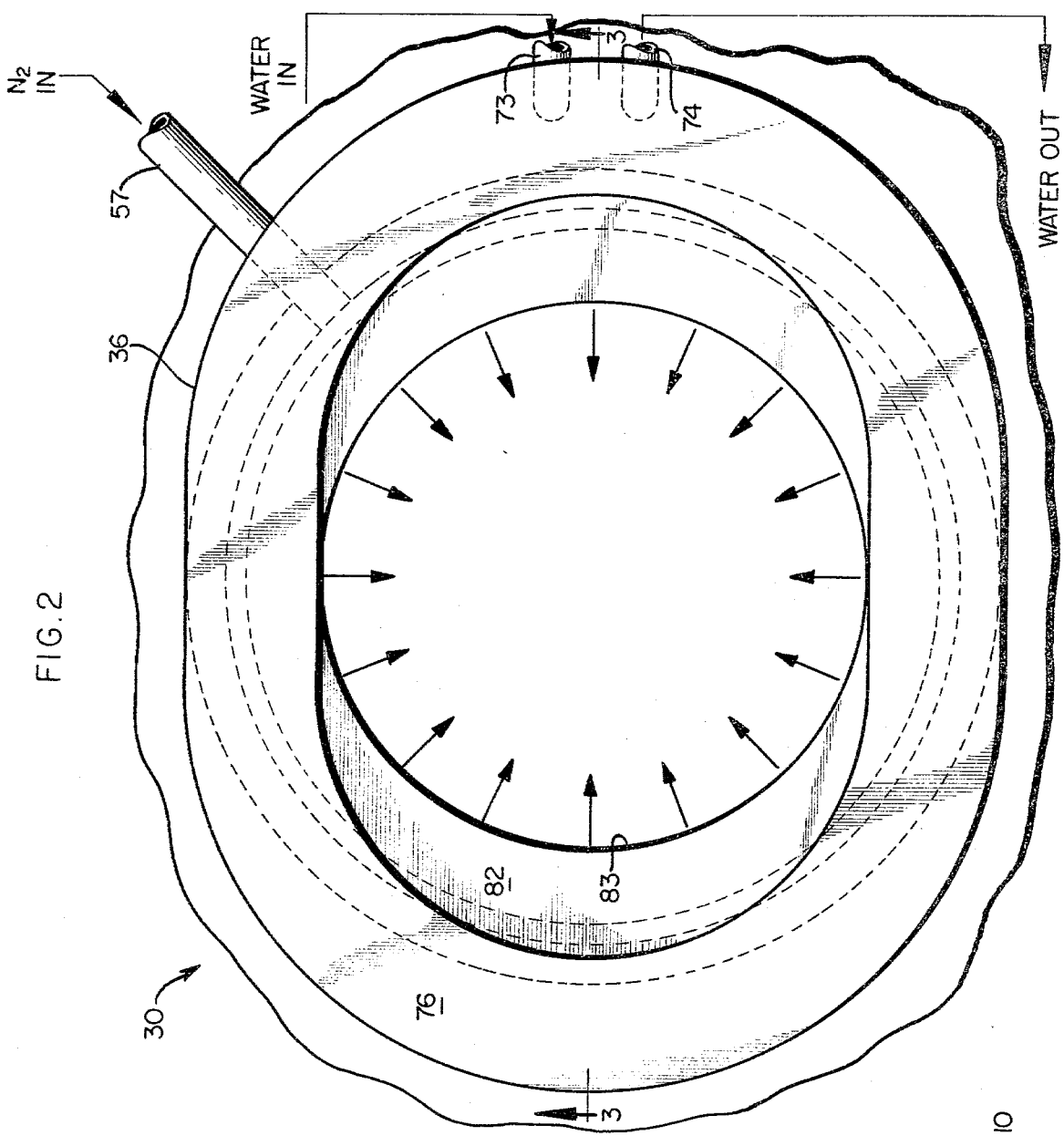
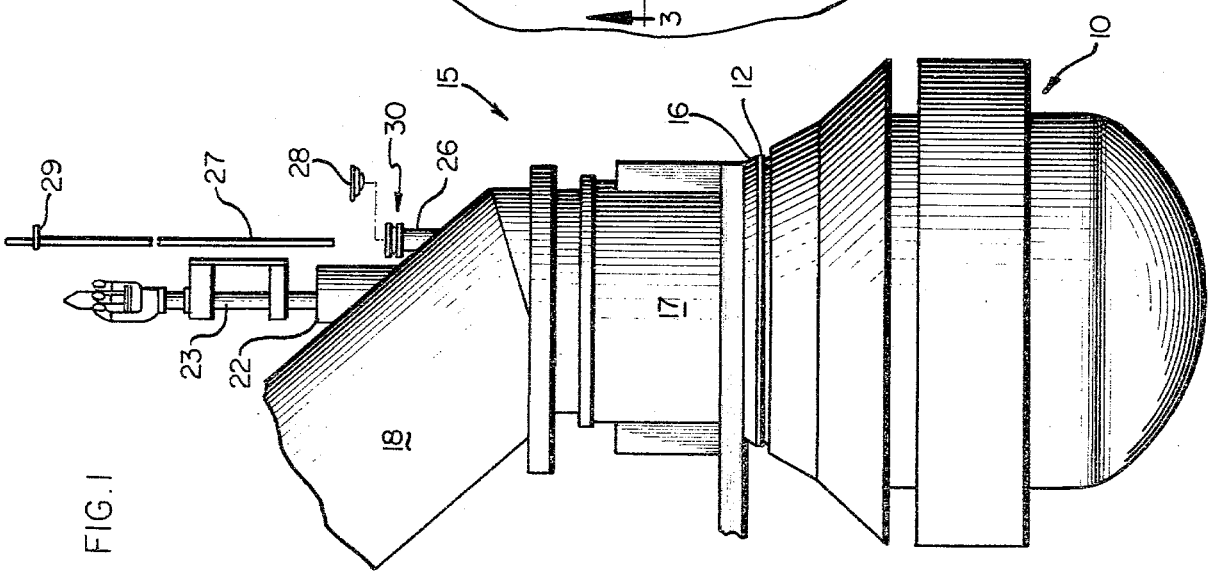

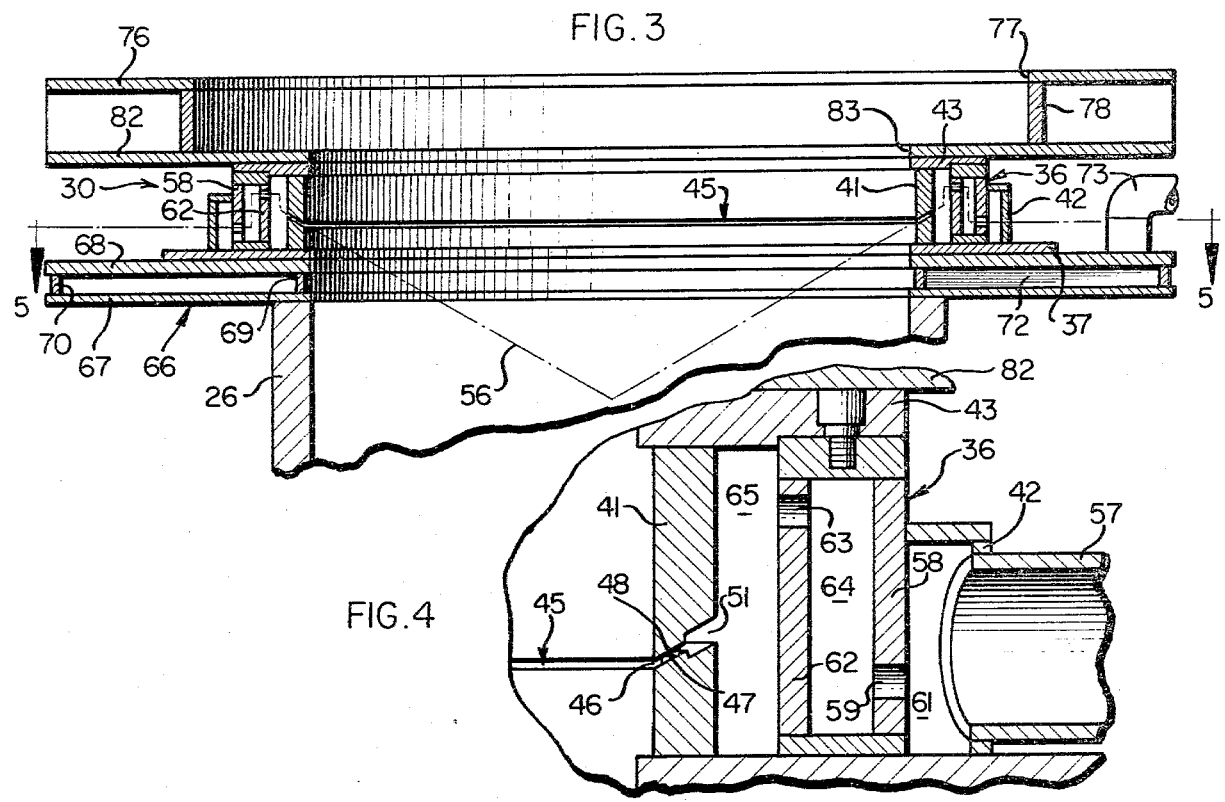
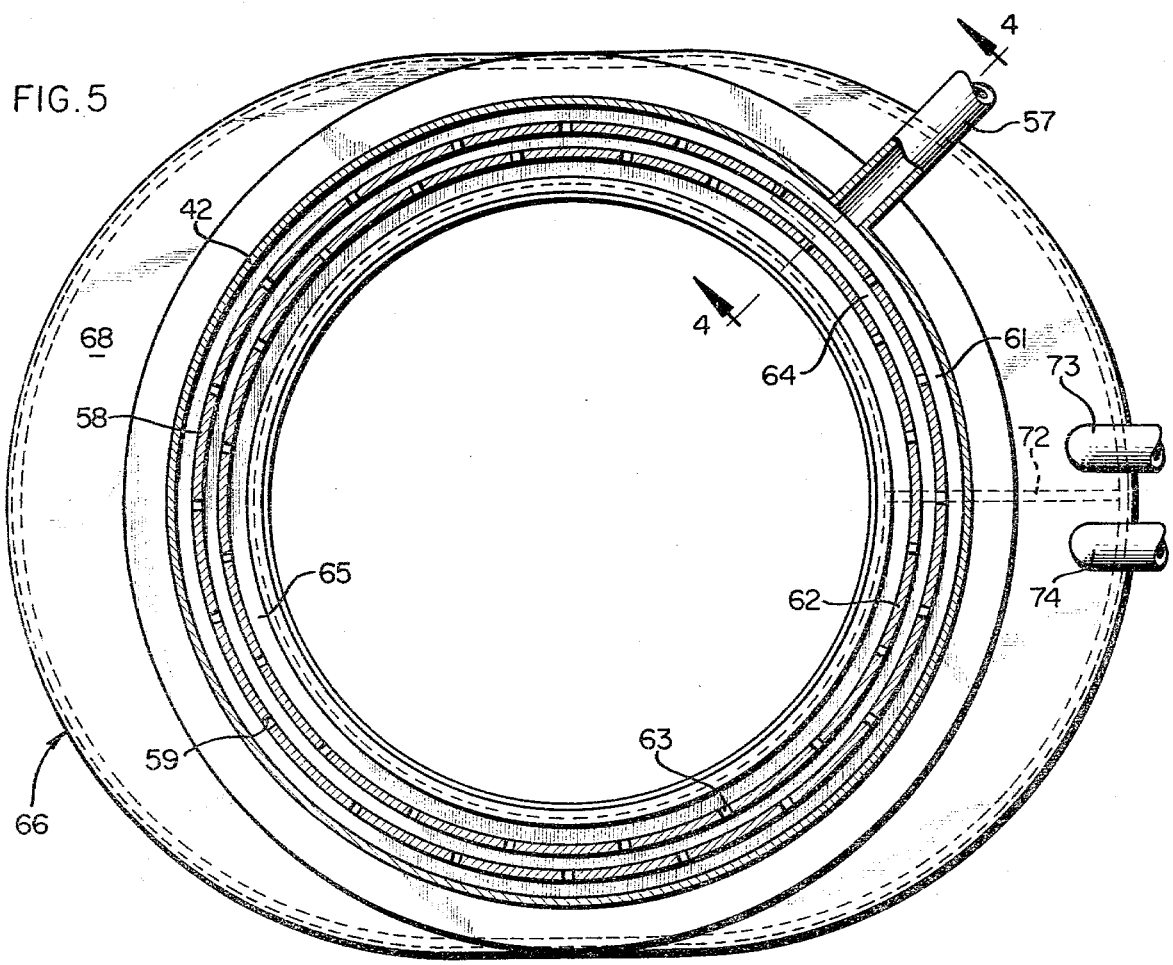

FLUID CLOSURE FOR AND METHOD OF PREVENTING FLOW THROUGH AN OPENING IN A FLUID AND PARTICULATE CONFINING AND CONVEYING STRUCTURE

One of the problems incident to the so-called basic oxygen steelmaking process is that of preventing gaseous and particulate material from escaping to the atmosphere during the steelmaking process. To this end, various types of off-gas hoods have been developed which serve to convey noxious gases and particulate materials away from the furnace while the latter is in operation and which prevent or minimize the escape of gases and particulate material to the atmosphere.

A similar problem occurs in oxygen steelmaking furnaces where, in order to monitor the temperature of the molten metal in the furnace during the period when oxygen under pressure is being supplied to the furnace, it becomes necessary to open a port in the off-gas hood to permit a temperature sensing lance to be inserted through the hood port and into the furnace. During the time interval that the port is open and the temperature monitoring lance is being inserted into or removed from the furnace, it is possible for gases and particulate materials to escape through the port to the atmosphere, which is undesirable from a pollution standpoint and for other reasons.

Accordingly, it is a general object of the present invention to provide a novel fluid closure for preventing gaseous and particulate material from flowing through an opening in a structure for confining or conveying such gases and/or materials.

A specific object is to provide a novel fluid closure for a port in an off-gas hood for an oxygen steelmaking furnace which prevents gases and particulate material from escaping to the atmosphere through the port while the port is open, particularly when a temperature sensing lance or other type of lance is being inserted into or removed from the port and the furnace is in operation.

Another object is to provide a novel fluid closure of the foregoing character, which is effective without any supplementary mechanical gates or sealing devices.

A further object is to provide a novel method of preventing gases and particulate material from escaping to the atmosphere through a port in a hood structure for an oxygen steelmaking furnace.

Other objects and advantages of the invention will become apparent from the following detailed description and accompanying sheets of drawings, in which:

FIG. 1 is a fragmentary view of a portion of an off-gas hood as the latter would appear when operably engaged with the mouth of an oxygen steelmaking furnace, the hood incorporating a fluid curtain generating nozzle embodying the features of the present invention;

FIG. 2 is an enlarged, top plan view of the fluid curtain generating nozzle of the present invention;

FIG. 3 is a transverse sectional view taken substantially along the line 3—3 of FIG. 2;

FIG. 4 is a fragmentary sectional view taken substantially along the line 4—4 of FIG. 5. and FIG. 5 is a transverse sectional view taken substantially along the line 5—5 of FIG. 3.

Briefly described, in its broader aspects, the present invention contemplates a novel fluid closure which prevents gases and/or particulate material from escaping through an opening in a structure for confining or conveying the gases and/or particulate material. In its more specific aspects, the present invention contemplates a novel nozzle for generating a fluid curtain which prevents noxious gases and particulate material from escaping to the atmosphere through a port in an off-gas hood for an oxygen steelmaking furnace whenever the port is open and the furnace is in operation. Such nozzle, to be hereinafter described in detail, includes a generally annular housing that is adapted to be mounted either directly on the off-gas hood, or on an extension thereof, so that a radially inner wall of the housing forms a continuation of the port in the off-gas hood. An uninterrupted orifice is defined by a gap in the radially inner wall of the housing, and means is provided for supplying an inert gas under pressure, such as nitrogen, to the orifice to create a continuous fluid curtain across the opening in the nozzle housing, the curtain preventing gases and/or particulate material from flowing outwardly through the opening into the atmosphere. Baffle means is provided in the nozzle housing for causing the curtain generating fluid to flow through a tortuous path through the housing and thus be evenly distributed throughout the housing. Consequently, a uniform flow is obtained through all portions of the orifice. The baffle means includes a pair of coaxial, cylindrical partitions, each of which has a plurality of circumferentially spaced apertures therethrough providing discrete flow paths for the curtain generating fluid. The walls of the gap which define the orifice are inclined downwardly at a predetermined angle so that the fluid curtain is substantially in the form of an inverted cone when established.

In FIG. 1, a furnace or converter of the type used to produce steel by the basic oxygen steelmaking process is illustrated and indicated generally at 10. An off-gas hood, indicated generally at 15, is shown engaged with the upper end of the furnace in the position it would occupy to receive gases and particulate material discharged from the mouth (not shown) of the furnace 10 during an oxygen steelmaking operation. The hood 15 thus includes a conical inlet 16, which is adapted to engage the upper end 12 of the furnace 10 in close-fitting, substantially sealed relation. As illustrated, the hood 15 includes a vertically extending cylindrical section 17 and an inclined section 18, which connects to an off-gas cleaning and particulate filtering system (not shown).

The inclined section 18 of the hood 15 includes a vertically extending cylindrical extension 22 having a port or opening (not shown) in the upper end thereof through which an oxygen lance 23 may be inserted for supplying oxygen to the molten metal in the furnace during the oxygen steelmaking process. A suitable closure in the form of a plug (also not shown) is mounted on the oxygen lance 23 to prevent fumes and particulate material from escaping to the atmosphere through the clearance space between the oxygen lance 23 and the open upper end of the extension 22 when the lance is in place and supplying oxygen to the furnace 10.

During the oxygen steelmaking process, it is desirable to monitor the temperature of the molten bath. While various devices are available for this purpose, temperature is conveniently measured by inserting a suitable temperature sensing lance into the furnace while oxygen is being supplied thereto by the oxygen lance. For this purpose, the inclined section 18 of the hood 15 is provided with another, vertically extending, tubular extension 26 through which a temperature sensing lance, indicated generally at 27, may be inserted. A suitable temperature sensing element, such as a thermocouple (not shown) is mounted in the lower portion of the lance 27 and an electrical signal proportional to the temperature of the bath in the furnace 10 is carried upwardly through conductors (also not shown) in the lance 27 to instrumentation remote from the furnace 10.

The temperature monitoring lance 27 is usually inserted into the furnace 10 through the extension 26 sometime after oxygen is being supplied to the furnace through the oxygen lance 23. Consequently, fumes, off-gases and particulate material, which are objectionable from a pollution standpoint, could escape to the atmosphere through the open upper end of the extension 26 during the period when a plug 28, which normally closes the open end of the extension, is removed and/or when the lance 27 is not fully inserted into the extension. When the temperature sensing lance 27 is fully inserted into the furnace 10, a collar 29 on the lance 27 engages and closes the upper end of the extension 26. Escape of the aforementioned gases and particulate material from the upper end of the extension 26 is prevented by a fluid closure, indicated generally at 30, which generates a fluid curtain that extends across the open end of the extension 26.

Referring now to FIGS. 2, 3 and 4 in connection with FIG. 1, it will be seen that the fluid closure 30 comprises a generally annular housing 36 having an annular plate-like base 37 which extends radially with respect to the axis of the extension 26, an annular, radially inner wall 41 which extends substantially coextensively with the inner periphery of the extension 26, an annular, radially outer wall 42, and an annular, radially extending, plate-like top wall 43. The various walls of the housing 36 are preferably joined together by welding, although other fastening techniques could be used.

As best seen in FIG. 4, the inner wall 41 includes means defining an uninterrupted orifice, indicated generally at 45, for generating a continuous fluid curtain at the upper end of the extension 26. The orifice 45 is provided by a gap 46, which is defined by a pair of substantially parallel, spaced surfaces 47 and 48 in the wall 41. The radially outer or upstream portion, indicated at 51, of the gap 46 may be enlarged to facilitate gauging, measuring and/or machining of the surfaces 47 and 48.

As will further be apparent from FIG. 4, the surfaces 47 and 48 are inclined downwardly with respect to a plane perpendicular to the axis of the extension 26 so that the fluid curtain generated by fluid under pressure discharging through the orifice 45 is directed radially inwardly toward the center of the extension 26 and has a generally inverted conical configuration. The cross sectional shape of the fluid curtain is represented by phantom lines in FIG. 3 and identified by the reference numeral 56. In this regard, while good results have been obtained when the downward angle of inclination of the orifice, measured from the horizontal, is about 30 degrees, such downward angle could also range from between about 25 to 60 degrees. In addition, while various types of fluids can be used to establish the curtain 56, gaseous nitrogen is preferred in the case of an oxygen steelmaking furnace.

Referring now to FIG. 5, it will be seen that a tubular inlet 57 is provided in the radially outer wall 42 of the housing 36 for supplying nitrogen under pressure to the enlarged portion 51 of the orifice 45 to generate the closure curtain 56. Thus, the curtain 56 will be maintained so long as nitrogen under pressure is supplied to the inlet 57.

In order to assure continuity of the curtain 56, baffle means is provided in the housing 36 for uniformly distributing the flow of nitrogen around the interior of the housing before the gas enters the enlarged portion 51 of the orifice 45. Such baffle means, in the present instance, comprises an annular partition in the form of an axially extending, cylindrical member 58 having a plurality of circumferentially spaced apertures 59 therethrough, and another annular partition in the form of an axially extending, cylindrical member 62, which is spaced radially inwardly from the partition 58 and having a plurality of circumferentially spaced apertures 63 therethrough. The partitions 58 and 62 extend generally perpendicularly to the flow of nitrogen from the inlet 57 to the orifice 45.

Before passing through the apertures 59 in the annular partition 58, the nitrogen is dispersed throughout an annular chamber 61 defined by the outer wall 42 of the housing 36 and the partition 58. After passing through the apertures 59 in the partition 58, the nitrogen flows into another annular chamber 64 between the partitions 58 and 62. After passing through the apertures 63 in the partition 62, the nitrogen is likewise dispersed throughout an annular chamber 65 defined between the partition 62 and the wall 41. The rings of apertures 59 and 63 in the partitions 58 and 62 are axially and circumferentially offset, as shown in FIGS. 4 and 5, and comprise discrete and tortuous flow paths for the nitrogen. Consequently, the nitrogen is evenly distributed throughout the housing 36 so that a uniform flow is obtained through the orifice 45.

The uniformity of the flow of nitrogen through the orifice 45 is also assured by sizing the apertures 59 and 63, and gap 46 so that a progressive reduction in the area of the flow path of the nitrogen from the inlet 57 to the orifice 45 take place. Thus, the total cross sectional area of the apertures 59 is preferably somewhat less than that of the inlet 57, the total cross sectional area of the apertures 63 is preferably somewhat less than that of the apertures 59, and the total cross sectional area of the gap 46 is preferably somewhat less than that of the apertures 63. The reduction in area of the flow path of the nitrogen through each restriction may, for example, be between about 3 to 25 percent.

With the foregoing construction, it will now be apparent that whenever nitrogen under pressure is being supplied to the inlet 57 of the nozzle 30 and the upper end of the extension 26 is open, such as prior to or after removal of the temperature sensing lance 27 from the furnace 10, an inverted conical curtain 56 of nitrogen will be maintained across the open upper end of the extension 26 with the apex of the curtain disposed toward the interior of the extension 26 so that noxious gases and particulate material flowing through the hood 15 will be prevented from escaping to the atmosphere. The nitrogen curtain 56 also prevents noxious gases and particulate material from escaping to the atmosphere when the lance 27 is present in the extension 26 but before the collar 29 has seated in the nozzle 30. In this regard, assuming that the internal diameter of the radially inner wall 41 of the nozzle 30 is about 24½ inches (62.23 cm.), good results have been obtained when the width of the gap 46, which defines the orifice 45, is between about 0.023 and about 0.027 inches (0.00584 to 0.00685 cm.), when the radial length of the gap 46 is about 0.375 inches (0.9525 cm.), and when the flow rate of the nitrogen is about 0.35 cubic meters per second.

In order to cool the nozzle housing 36, the housing may be mounted on a flattened, annular manifold or casing 66 (FIG. 3) having a pair of axially spaced, lower and upper walls 67 and 68 and radially inner and outer walls 69 and 70, respectively. A radially extending divider 72 (FIGS. 3 and 5) prevents cross flow between a cooling water inlet 73 (FIGS. 2 and 5), which communicates with the interior of the housing 66 on one side of the divider 72, and a water outlet 74, which communicates with the interior of the housing 66 on the opposite side of the divider 72.

The nozzle housing 30 may also be cooled when the collar 29 is engaged therewith and the furnace 10 is in operation by continuously purging the housing 36 with small amounts of nitrogen.

The cross sectional shape of the portion of the plug 28 immediately above the portion thereof that extends into the circular opening in the nozzle housing 36 is oval and, since the collar 29 on the temperature sensing lance 27 is likewise oval, a plate 76 (FIGS. 2 and 3) having an oval opening 77 therein of substantially the same dimensions as that of the oval portion of the closure plug 28 and collar 29 is mounted on the nozzle housing 36. The plate 76 is supported in vertically spaced relation above the nozzle housing 36 by an axially extending, oval-shaped spacer member 78 which is mounted on another plate 82 that is secured to the upper plate 43 of the nozzle housing 36. The opening, indicated at 83, in the plate 82 is of the same configuration as the opening in the nozzle housing plate 43 i.e. circular.

It will be understood that if the portion of the closure 28 above the portion thereof that extends into the nozzle housing 36 were circular and if the lance collar were circular, the opening 77 in the plate 76 would likewise be circular.

It will also be understood that, instead of providing apertures in the partitions or cylindrical members 58 and 62 to uniformly distribute nitrogen in the housing 36, this same function could be performed by axially shortening the cylindrical members 58 and 62 to provide annular gaps of predetermined widths between the lower and upper edges of the cylindrical members 58 and 62, respectively, and the adjacent structure of the housing 36.

It will further be understood that while the nozzle 30 has been herein described in connection with the extension 26 for the temperature sensing lance 27, the nozzle is also capable of use in other applications, such as in connection with the extension 22 which receives the oxygen lance 23.

The present invention also contemplates a novel method for preventing gases and particulate material from escaping to the atmosphere through a port in a hood for an oxygen steelmaking furnace when the latter is in operation. Such method includes the steps of mounting a generally annular nozzle, such as the housing 36 having the uninterrupted orifice 45 in the radially inner wall 41 thereof, on the hood 15 for the furnace 10 so that the nozzle housing 36 circumscribes the port provided by the extension 26 and so that fluid discharging from the port 45 is directed radially inwardly toward the center of the port. The method also includes the step of supplying fluid under pressure, such as gaseous nitrogen, to the nozzle so that a uniform curtain of nitrogen is maintained across the port. Consequently, gases and particulate materials are prevented from escaping to the atmosphere through the port. The method may also include the additional step of inclining the orifice in the nozzle downwardly with respect to a plane perpendicular to the axis of the port so that the fluid curtain is generally in the form of an inverted cone.

While only one embodiment of the invention has been herein illustrated and described in detail, it will be understood that modifications, variations and equivalents thereof may be developed without departing from the spirit of the present invention as defined in the appended claims.

We claim:

1. In a structure for confining and conveying a fluid and having an opening therein communicating with the interior of said structure, a fluid closure for preventing fluid from flowing through said opening comprising means defining an uninterrupted orifice extending around the periphery of the opening in said fluid confining structure and operable to direct fluid radially inwardly toward the center of said opening, said orifice being defined by a gap between a pair of substantially parallel, spaced surfaces, and means for supplying fluid under pressure to said orifice to create a continuous fluid curtain across said opening, whereby said fluid curtain prevents particulate material and fluids from flowing through said opening when said curtain is established.

2. The fluid closure of claim 1, in which said spaced surfaces are inclined downwardly with respect to the axis of said opening so that said fluid curtain is of a generally inverted conical configuration.

3. The fluid closure of claim 2, in which the inclination of said orifice is such that the apex of said fluid curtain is disposed toward the interior of said fluid confining structure.

4. The fluid closure of claim 1, in which a nozzle is mounted on said fluid confining structure so as to circumscribe the opening in said structure, and said orifice is provided in said nozzle.

5. The fluid closure of claim 4, in which said nozzle comprises a generally annular housing having a wall extending substantially coextensively with the periphery of the opening in said confining structure, and said orifice is provided in said wall.

6. The fluid closure of claims 2 or 5, in which said housing has another wall spaced radially outwardly from said first mentioned wall, a fluid inlet is provided in said other wall, and baffle means is provided in said housing between said fluid inlet and said orifice, said baffle means defining a tortuous flow path for said curtain generating fluid so that said fluid is evenly distributed throughout said housing and a uniform flow is obtained through said orifice.

7. The fluid closure of claim 6, in which said baffle means comprises at least one partition in said nozzle housing and extending generally perpendicular to the path of flow of said curtain generating fluid from said inlet to said orifice, said partition having a plurality of circumferentially spaced apertures therein through which said curtain generating fluid flows.

8. The fluid closure of claim 7, in which said baffle means comprises at least one other partition in said housing and extending generally perpendicular to the path of flow of said curtain generating fluid from said inlet to said orifice, and said other partition having a plurality of circumferentially spaced apertures therein through which said curtain generating fluid flows.

9. The fluid closure of claim 8, in which the total area of the apertures in said one partition is less than the area of said inlet, the total area of the apertures in said other partition is less than the total area of the apertures in said one partition, and the area of said orifice is less than the total area of the apertures in said other partition.

10. The fluid closure of claim 9, in which the reduction in area of the flow path for said curtain generating fluid through the apertures in said one partition, said other partition, and said orifice is between about 3 to 25 percent.

11. The fluid closure of claim 8, in which the apertures in said one partition are circumferentially staggered from the apertures in said other partition.

12. The fluid closure of claim 8, in which said housing has top and bottom walls, and said one partition and said other partition comprise a pair of concentric, cylindrical members extending between said top and bottom walls.

13. The fluid closure of claim 4, in which cooling means is disposed between said nozzle and said fluid confining structure.

14. The fluid closure of claim 13, in which said cooling means comprises a casing surrounding the opening in said fluid confining structure and engaging said nozzle in heat transfer relation, and said casing has an inlet adapted to be connected to a source of cooling fluid and an outlet adapted to discharge cooling fluid from said casing after circulating therethrough.

15. In a hood structure adapted to receive gases and particulate material discharging from the mouth of an oxygen steelmaking furnace when the latter is in operation so as to prevent said gases and particulate material from escaping to the atmosphere, said hood structure including a port through which a temperature sensing lance may be inserted to monitor the temperature of the contents of said furnace when the latter is in operation, the improvement of a fluid closure for preventing gases and particulate material from escaping to the atmosphere through said port when the latter is uncovered to permit insertion or removal of said lance, said fluid closure comprising means defining an uninterrupted orifice around the periphery of said port for directing fluid toward the center of said port in a continuous fluid curtain, said orifice being defined by a gap between a pair of substantially parallel, spaced surfaces, and means for supplying fluid under pressure to said orifice to create said curtain, whereby said fluid curtain prevents gases and particulate material from escaping to the atmosphere when fluid under pressure is being supplied to said orifice and said curtain is established.

16. The fluid closure of claim 15, in which said orifice defining means comprises a nozzle mounted on said hood structure so as to circumscribe said port.

17. The fluid closure of claim 16, in which said fluid closure comprises a housing mounted on said hood structure and having a wall extending substantially coextensively with the periphery of said port, and said nozzle is provided in said wall.

18. The fluid closure of claim 16, in which said housing has another wall having a fluid inlet adapted to be connected to a source of fluid under pressure, and baffle means is provided in said housing between said fluid inlet and said orifice, said baffle means defining a tortuous flow path for said curtain generating fluid so that said fluid is evenly distributed throughout said housing before discharging through said orifice.

19. The fluid closure of claim 18, in which said baffle means comprises at least one partition in said housing between said fluid inlet and said orifice, and a plurality of circumferentially spaced apertures are provided in said partition providing discrete flow paths for said curtain generating fluid.

20. In a method of preventing gases and particulate material from escaping to the atmosphere through a port in a hood for an oxygen steelmaking furnace when the latter is in operation, the improvement comprising the steps of forming a generally annular nozzle having an inner periphery having an uninterrupted orifice therein, said uninterrupted orifice being provided by an uninterrupted gag between a pair of substantially parallel, spaced surfaces in said inner periphery, mounting said nozzle on said hood so that said nozzle circumscribes said port and said orifice directs fluid radially inwardly toward the center of said port from said uninterrupted gap, and supplying fluid under pressure to said uninterrupted gap so as to maintain a continuous fluid curtain across said port.

21. The method of claim 20, including the additional step of inclining said spaced surfaces downwardly with respect to a plane perpendicular to the axis of said port so that said fluid curtain generated by fluid discharging through said orifice is generally in the form of an inverted cone.

22. In a structure for confining and conveying a fluid and having an opening therein communicating with the interior of said structure, a fluid closure for preventing fluid from flowing through said opening comprising a generally annular housing having a wall extending substantially coextensively with the periphery of the opening in said confining structure, said wall having an uninterrupted orifice therein operable to direct fluid radially inwardly toward the center of said opening, means for supplying fluid under pressure to said orifice to create a continuous fluid curtain across said opening, said housing also having another wall spaced radially outwardly from said first mentioned wall, said other wall also having a fluid inlet therein, at least one partition in said housing extending generally perpendicular to the path of flow of said curtain generating fluid from said inlet to said orifice, said one partition having a plurality of circumferentially spaced apertures therein through which said curtain generating fluid flows, at least one other partition in said housing extending generally perpendicular to the path of flow of said curtain generating fluid from said inlet to said orifice, said other partition having a plurality of circumferentially spaced apertures therein through which said curtain generating fluid flows, and the apertures in said one partition being circumferentially staggered and axially spaced from the apertures in said other partition.

* * * * *